US009832796B2

United States Patent
Mehta

(10) Patent No.: US 9,832,796 B2
(45) Date of Patent: Nov. 28, 2017

(54) MULTI-EGRESS BACKHAUL

(71) Applicant: Parallel Wireless, Inc., Nashua, NH (US)

(72) Inventor: Pratik Vinod Mehta, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 44 days.

(21) Appl. No.: 14/711,293

(22) Filed: May 13, 2015

(65) Prior Publication Data

US 2015/0334750 A1 Nov. 19, 2015

Related U.S. Application Data

(60) Provisional application No. 61/992,648, filed on May 13, 2014.

(51) Int. Cl.
*H04W 4/00* (2009.01)
*H04W 76/02* (2009.01)
(Continued)

(52) U.S. Cl.
CPC ........... *H04W 76/02* (2013.01); *H04W 24/02* (2013.01); *H04W 24/10* (2013.01); *H04W 48/16* (2013.01);
(Continued)

(58) Field of Classification Search
CPC .......... H04L 2012/5608; H04W 84/12; H04W 88/08; H04W 80/04; H04W 88/06; H04W 84/18; H04W 36/30; H04W 36/24
(Continued)

(56) References Cited

U.S. PATENT DOCUMENTS 8,355,343 B2 * 1/2013 Kish .................... H04L 45/125
370/254
8,630,267 B1 1/2014 Jin
(Continued)

FOREIGN PATENT DOCUMENTS

EP 2237612 A1 10/2010
WO 2011092698 A1 8/2011
(Continued)

OTHER PUBLICATIONS

"Incorporation of Common, In-Coverage, and Out of Coverage Requirements," Qualcomm, 3rd Generation Partnership Project, 3GPP TSG-SA WG1 Meeting #61, Feb. 2, 2013, retrieved from http://www.3gpp.org/ftp/tsg_sa/WG1_serv/TSGS1_61_Prague/Docs/.
(Continued)

*Primary Examiner* — Brenda H Pham
(74) *Attorney, Agent, or Firm* — Michael Y. Saji

(57) ABSTRACT

A method for providing increased backhaul capacity in an ad-hoc mesh network is disclosed. The method involves attaching a mobile base station in an ad-hoc mesh network to a macro cell; measuring at least one of a backhaul signal quality with the macro cell and a throughput to the macro cell; reporting information, including a signal quality parameter, a physical position of the mobile base station, a cell identifier of the macro cell, and the measured throughput, to a coordinating node; determining if the connection between the mobile base station and the macro cell is currently in use by the ad-hoc mesh network, and whether the link exceeds a minimum quality threshold; and sending, to the mobile base station, an instruction to advertise a connection from the mobile base station to the macro cell to other nodes in the ad-hoc mesh network.

15 Claims, 8 Drawing Sheets

(51) Int. Cl.
*H04W 24/10* (2009.01)
*H04W 48/16* (2009.01)
*H04W 24/02* (2009.01)
*H04W 92/20* (2009.01)
*H04W 84/04* (2009.01)
*H04W 84/10* (2009.01)
*H04W 84/22* (2009.01)
*H04W 88/04* (2009.01)

(52) U.S. Cl.
CPC .......... *H04W 92/20* (2013.01); *H04W 84/045* (2013.01); *H04W 84/105* (2013.01); *H04W 84/22* (2013.01); *H04W 88/04* (2013.01)

(58) Field of Classification Search
USPC ............ 370/310.2, 328, 332, 333, 338, 349
See application file for complete search history.

(56) References Cited

U.S. PATENT DOCUMENTS

| | | | |
|---|---|---|---|
| 8,913,619 | B2 | 12/2014 | Xu et al. |
| 8,967,533 | B2 | 3/2015 | DeVaul et al. |
| 8,989,155 | B2 | 3/2015 | Forenza et al. |
| 9,119,120 | B2* | 8/2015 | Yeh ..................... H04W 28/16 |
| 9,167,623 | B2 | 10/2015 | Ikeda et al. |
| 2002/0077151 | A1 | 6/2002 | Matthews et al. |
| 2005/0074019 | A1 | 4/2005 | Handforth et al. |
| 2005/0153725 | A1 | 7/2005 | Naghian et al. |
| 2008/0194246 | A1 | 8/2008 | Klein |
| 2009/0005005 | A1 | 1/2009 | Forstall et al. |
| 2009/0111456 | A1 | 4/2009 | Shaffer et al. |
| 2009/0149180 | A1 | 6/2009 | Kitazoe |
| 2009/0323621 | A1 | 12/2009 | Touboul et al. |
| 2012/0058765 | A1 | 3/2012 | Choi |
| 2013/0010777 | A1 | 1/2013 | Periyalwar et al. |
| 2013/0059585 | A1 | 3/2013 | Giloh |
| 2013/0060869 | A1 | 3/2013 | Davis et al. |
| 2013/0064076 | A1 | 3/2013 | Periyalwar et al. |
| 2013/0121265 | A1 | 5/2013 | Awoniyi et al. |
| 2013/0185617 | A1 | 7/2013 | Roh et al. |
| 2013/0194948 | A1* | 8/2013 | Mallik .................. H04W 24/00 370/252 |
| 2014/0056243 | A1 | 2/2014 | Pelletier et al. |
| 2014/0204846 | A1 | 7/2014 | Maltsev et al. |
| 2014/0362846 | A1 | 12/2014 | Li |
| 2014/0369365 | A1 | 12/2014 | Denio et al. |
| 2015/0350880 | A1 | 12/2015 | Li et al. |

FOREIGN PATENT DOCUMENTS

| | | |
|---|---|---|
| WO | 2013058607 A1 | 4/2013 |
| WO | 2014113749 A1 | 7/2014 |

OTHER PUBLICATIONS

"Discussion on Relaying for D2D Proximity Services," ETRI, 3rd Generation Partnership Project, 3GPP TSG-RAN WG2 Meeting #83, Aug. 9, 2013, retrieved from http://www.3gpp.org/ftp/tsg_ran/WG2_RL2/TSGR2_83/Docs/ (Not Believed to Be Prior Art).

"FS_ProSe: Public Safety Use Cases," Alcatel-Lucent, NIST, Nokia Siemens Networks, U.S. Cellular, 3rd Generation Partnership Project, 3GPP TSG-SA WG1 Meeting #56, Nov. 7, 2011.

"Update of Solution R1," CATT, CATR, 3rd Generation Partnership Project, SA WG2 Meeting #100, Nov. 12, 2013, retrieved from http://www.3gpp.org/ftp/Meetings_3GPP_SYNC/SA/SA2/Docs/ (Not Believed to Be Prior Art).

"UE Relay for Public Safety," HTC, 3rd Generation Partnership Project, SA WG2 Meeting S2 #98, Jul. 9, 2013, retrieved from http://www.3gpp.org/ftp/tsg_sa/WG2_Arch/TSGS2_98_Valencia/Docs/ (Not Believed to Be Prior Art).

* cited by examiner

MULTI-EGRESS BACKHAUL

CROSS-REFERENCE STATEMENT

This application claims the benefit under 35 U.S.C. §119 (e) of U.S. Provisional App. No. 61/992,648, titled "System and Method for Intelligently Pooling or Adapting Wireless Bandwidth," filed May 13, 2014, which is hereby incorporated by reference in its entirety for all purposes. Additionally, U.S. Pat. No. 8,867,418, "Methods for incorporating an ad hoc cellular network into a fixed cellular network," is hereby incorporated herein by reference in its entirety for all purposes. Additionally, U.S. Pat. App. Pub. Nos. US20140086120, US20150045063, and US20150078167 are also hereby incorporated by reference in their entirety for all purposes.

BACKGROUND

Recent developments have enabled the creation of access networks leveraging the combination of ad-hoc mesh networking and wireless backhaul. Such networks are particularly helpful for providing public safety personnel with a network in an area that does not have good network coverage. For example, a police vehicle may bring its own network coverage to a remote area by providing an in-vehicle base station, which connects to a service provider's network as a mobile device, such as a Long Term Evolution (LTE) user equipment (UE). The police vehicle's in-vehicle base station can connect to a macro cell provided by the commercial network operator to provide a backhaul connection for all devices in the vicinity of the in-vehicle base station.

However, one LTE backhaul connection may not be sufficient for a network supporting multiple devices, each of which may be capable of using a significant amount of bandwidth. Additionally, when multiple in-vehicle base stations are joined as nodes in a mesh network, the problem is multiplied by the number of devices attached to all base stations in the mesh. It is therefore desirable to provide increased throughput on the backhaul connection used for egress from the mesh.

BRIEF SUMMARY

In some embodiments, a method for providing backhaul capacity in an ad-hoc mesh network is disclosed, comprising attaching, at a first mobile base station that is a node of an ad-hoc mesh network, to a macro cell not being used as backhaul by the mesh network; measuring, at the first mobile base station, at least one of a backhaul signal quality with the macro cell and a throughput to the macro cell; reporting, from the first mobile base station to a coordinating node, information comprising at least two of a signal quality parameter, a physical position of the first mobile base station, a cell identifier of the macro cell, and the measured throughput; and receiving, at the first mobile base station, an instruction to advertise a backhaul connection from the first mobile base station to the macro cell to other nodes in the ad-hoc mesh network, thereby providing an increase in overall backhaul capacity of the ad-hoc mesh network.

The signal quality parameter may be one of a Reference Signal Received Power (RSRP) and a Reference Signal Received Quality (RSRQ), and wherein the cell identifier may be a Long Term Evolution (LTE) Enhanced Cell Global Identifier (eCGI) or physical cell identifier (PCI). The physical position may be a set of coordinates derived using a Global Positioning System (GPS). The ad-hoc mesh network may be a Wi-Fi mesh network. The first mobile base station may be a vehicle-mounted base station with Wi-Fi and cellular radio access connectivity. The method may further comprise attaching periodically to the macro cell, and reporting the information periodically, wherein the macro cell may be a particular macro cell that is available at the time that attaching is performed. The method may further comprise determining whether the macro cell may be currently in use as a backhaul connection for the ad-hoc mesh network, and whether the macro cell information exceeds a minimum quality threshold; and sending, to the first mobile base station, an instruction to advertise the backhaul connection from the first mobile base station to the macro cell to other nodes in the ad-hoc mesh network. The determining may be performed at the first mobile base station, or at the coordinating node. The first mobile base station may further comprise a Long Term Evolution (LTE) cellular modem coupled to the base station via a serial interface. The first mobile base station may be a multi-radio access technology node having at least a Long Term Evolution (LTE) modem. The cellular modem may be a Long Term Evolution (LTE) modem. Backhaul capacity may subsequently be adjusted by adding or removing additional backhaul connections to or from the ad-hoc mesh network. A base station in an ad-hoc wireless network, comprising a processor; and a memory coupled to the processor and containing instructions which, when executed, are configured to cause the processor to perform the above steps are also disclosed, in some embodiments.

In some embodiments, a method for managing backhaul capacity in an ad-hoc mesh network is disclosed, comprising receiving, at a coordinating node, a measurement of a first macro cell link from a first mobile base station in the ad-hoc mesh network, and a measurement of a second macro cell link from a second mobile base station in the ad-hoc mesh network, wherein each macro cell link measurement comprises at least two of a signal quality parameter, a physical position of the first mobile base station, a cell identifier of a first macro cell, and a measured throughput between the first mobile base station and the first macro cell; determining whether either the first macro cell link or the second macro cell link are currently in use as connections for the ad-hoc mesh network, and whether either of the macro cell link measurements exceeds a minimum quality threshold; and sending, to the first mobile base station, an instruction to advertise a connection from the first mobile base station to the first macro cell to other nodes in the ad-hoc mesh network, thereby providing an increase in overall backhaul capacity of the ad-hoc mesh network. The coordinating node may be a node in the ad-hoc mesh network using an X2 protocol to communicate with other nodes in the ad-hoc mesh network.

DETAILED DESCRIPTION

Figure 1:
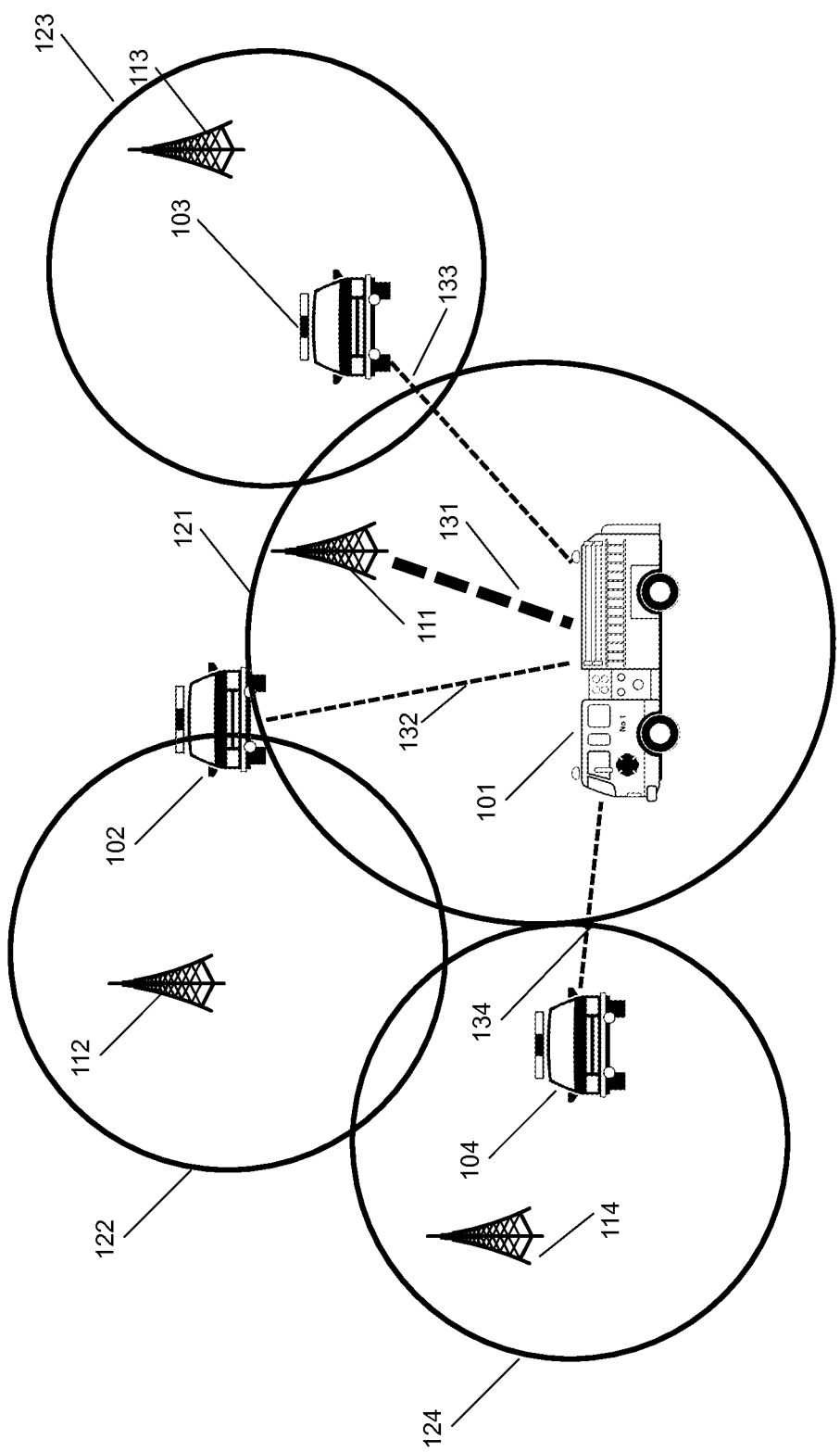
FIG. 1 is a schematic diagram of a first deployment scenario, in accordance with some embodiments.

Consider the case where in-vehicle base stations are using existing LTE coverage as backhaul to the core network. While in transit, each of the in-vehicle base stations may connect to a nearby LTE macro cell for providing backhaul. The connectivity to a macro cell may be referred to as "bring-your-own coverage" (BYOC) capability, and may be enabled by an LTE UE modem on a serial bus, such as an LTE modem on a universal serial bus (USB), incorporated into each of the in-vehicle base stations. These LTE macro cells would be located near each vehicle, and since the vehicles are in transit and/or are physically in different locations, each vehicle may be on a different macro cell.

However, once the vehicles meet at a particular emergency site, all but one of the in-vehicle base stations may shut down their individual access/BYOC LTE cells when they are near another vehicle with an active BYOC LTE cell (in this figure, the van). This results in a reduction of interference in the LTE band, while still permitting the base stations to use Wi-Fi for mesh backhaul.

However, the capacity of the uplink macro LTE cell may be limited by a large number of UEs connected to that macro cell, or by excessive usage by UEs on that macro cell, or by other factors not within the control of the in-vehicle base stations.

Turning on more in-vehicle base stations' LTE backhaul will cause each vehicle to attach to and increase load on the same macro base station, and thus will not alleviate the backhaul capacity bottleneck.

This is compounded by the likelihood that existing fixed macro cell coverage at an emergency site may already be overloaded in the event of an emergency by a large number of users and/or public safety first responders arriving in the area.

To mitigate this, a configuration can be determined that increases the overall backhaul, WAN, and/or uplink/downlink capacity by using LTE UEs camping on to distinct macro cells. The LTE UEs may be physically co-located in vehicles, in some embodiments. The LTE UEs may connect to different commercial cells and pool the capacity of their connections to these different cells for use by the entire mesh network. In other words, in some embodiments, the wireless mesh network may perform adapting, bonding, or pooling of mesh egress links among base stations that are connected to multiple macro cells, thereby leveraging the multiple macro cells for increasing backhaul capacity.

In some embodiments, to achieve increased backhaul capacity, the in-vehicle base stations may be instructed to measure and report back macro coverage quality and properties (e.g., enhanced cell global identity (ECGI), etc.) along with their global positioning system (GPS) coordinates.

In some embodiments, the in-vehicle base stations may also periodically latch on to the macro LTE network and measure the throughput they are seeing to a coordination server. This and other KPIs can then be reported to the coordination server.

The coordination server determines if there are in-vehicle base stations that can attach to or camp on macro cells that have not yet been attached to by any other in-vehicle base stations in the same mesh, or by other base stations, or by other users, such that there is still macro capacity available to use. This may involve load information derived by direct coordination via the X2 protocol with the in-vehicle base stations. This may also involve direct coordination via the X2 protocol with the macro base stations. This may also involve determination of load on the macro base stations reflected or passed to the coordination server via core network nodes. This may also include deriving other information via the X2 protocol or via another protocol, such as neighbor lists, active macro cell connection lists, UE measurement reports, GPS coordinates or other geographic or positional coordinates, and/or other information.

If the in-vehicle base station attaches, it may then determine whether it is seeing good quality uplink/downlink LTE capacity/coverage. If so, the coordination server may then instruct such in-vehicle base stations to turn on their LTE uplink and advertise wide area network (WAN)/Internet connectivity/quality on the mesh.

The method disclosed above thus enables an increase of the overall WAN/uplink capacity of the mesh, thus improving the uplink and downlink capacity of base stations that provide bring-your-own-coverage (BYOC) LTE and Wi-Fi access, and consequently, their access users.

Once the additional backhaul connection is established via the additional macro cell, routing may be performed within the mesh to send outgoing packet flows to one or more of the plurality of backhaul connections. A variety of routing protocols and methods may be used as are known in the prior art and/or according to proprietary protocols, which are out of the scope of this application.

As described above and elsewhere herein, the coordination server may be located at a core network, or in other embodiments may be provided as a module within one or more of the mesh base stations. The in-vehicle base stations may be multi-radio access technology (multi-RAT) nodes, with a plurality of wireless access and backhaul modules, including LTE modules for providing LTE access to users and other base stations, LTE UE modems connected internally to the base stations for providing LTE backhaul, and also potentially including additional Wi-Fi and LTE networking modules. In some embodiments, Wi-Fi (IEEE 802.11a/b/g/ac/af/ag 2.4 GHz, 5 GHz, or other Wi-Fi) may be used for creating a mesh network, as described in U.S. Pat. No. 8,867,418, "Methods for incorporating an ad hoc cellular network into a fixed cellular network," hereby incorporated herein in its entirety for all purposes.

In some embodiments, the cloud can leverage an interface to an existing self-optimizing network (SON) module of the macro, the mesh, or of the network as a whole to learn about the macro coverage that various in-vehicle base stations would be able to leverage. For specific usage in this case, the operator can configure visible and audible indications in certain in-vehicle base stations to help the driver place such a vehicle, that it is helping boost the overall mesh WAN capacity.

In some embodiments, the base station may obtain, report, and use information about macro coverage that exists at the base station. In some cases the UE modem at the base station may be used to obtain this information. The information may include bandwidth metrics, such as uplink/downlink capacity and latency; channel quality metrics, such as RSSI, RSRP, RSRQ, and SNR; and motion reporting metrics, such as rate of change of channel quality, and speed, acceleration, and position information of the UE modem at the base station, including GPS coordinates and accelerometer telemetry.

In some embodiments, vehicles may also be positioned or re-positioned such that they enable access to different macro cells, including commercial macro cells, and audio and/or video feedback may be given to a driver of the vehicle in order to facilitate positioning of the vehicle. For example, if a first vehicle is located close to two macro cells, but a second vehicle is already attached to one of the two macro cells, the first vehicle may provide directions to the driver to drive toward the other macro cell by, e.g., showing a point on a map with text guidance and voice and audio cues to drive in a particular direction along particular roads. A sound may be provided to indicate when the driver has reached a satisfactory location. This functionality may be integrated into other mapping and navigation functionality present in the vehicle, such as a global positioning system (GPS) navigation module.

If no driver is present and the vehicle is autonomously or semi-autonomously guided, the base station may send instructions to the controller of the vehicle to direct the vehicle accordingly. This may be used for many different types of vehicle, including automobiles, such as cars, trucks, and public safety vehicles; military vehicles such as tanks and other transport; aerial vehicles such as airplanes, balloons, and drones; marine vehicles such as boats; autonomous and semi-autonomous mobile platforms; and other vehicles.

In some embodiments, to facilitate the above navigation function, a specific macro cell may be identified to which the vehicle should attempt to move, and may also determine a location to which the vehicle should attempt to move based on the specific macro cell while still prioritizing continued connectivity to the mesh network (e.g., via Wi-Fi). Geographic features such as terrain and elevation may be considered. This procedure may be performed at the base station or at a central node, in various embodiments.

Deleting routes may be provided in some embodiments. If a backhaul connection deteriorates, it should be deleted from the plurality of available mesh egress connections. Logic at one or more nodes, which may include a coordinating node, may prevent the last remaining backhaul connection from being deleted. Deleted routes may require rerouting of tunnels and packet flows.

Routing may be provided in some embodiments. If a new macro cell has better connectivity to certain nodes, that connectivity should be weighted in a decision.

Multi-operator may be provided in some embodiments. In a multi-operator core network (MOCN) situation, connectivity to a particular operator's core network should be weighted. In a non-MOCN situation, it may be helpful in some cases to have connectivity to a plurality of operator networks for redundancy and reduced reliance on network availability of each operator.

Wi-Fi or wired backhaul may be provided in some embodiments. If a new backhaul connection becomes available that is wired, or that is a high-quality Wi-Fi connection, these backhaul connections should also be added as new egress connections.

Non-LTE capabilities may be provided in some embodiments. In addition to LTE, other wireless technologies are contemplated, including 3G/4G/5G, CDMA, UMTS, WiMAX, point-to-point microwave, satellite or drone connectivity, Wi-Fi, or any other wireless data protocol.

FIG. 1 is a schematic diagram of a first deployment scenario, in accordance with some embodiments. Fire engine 101 and police vehicles 102, 103, 104 are co-located, for example, as part of a public safety response to a disaster site. Vehicles 101, 102, 103, 104 each include a base station, and are connected in a mesh network. Macro towers 111, 112, 113, 114 are located in the surrounding area. Macro tower 111 has coverage area 121. Macro tower 112 has coverage area 122. Macro tower 113 has coverage area 123. Macro tower 114 has coverage area 124. A coordination server (not shown) may be present on a core network.

In some embodiments, each vehicle 101, 102, 103, 104 may include an in-vehicle base station, providing a wireless access network to users (not shown), while using a wireless backhaul link, providing connectivity to a core network and/or the public Internet, via the mesh network. The in-vehicle base stations may be multi-radio access technology (RAT) nodes, supporting Long Term Evolution (LTE) for access (i.e., LTE base station functionality) and also LTE for backhaul using a UE modem, in some embodiments. The in-vehicle base stations are further described below and in the description of FIG. 6. The network may be an ad-hoc mesh network, e.g., the mesh network may enable addition and removal of network nodes, such that a mesh network may be rapidly formed when multiple vehicles arrive at the same destination.

In some embodiments, fire engine 101 is configured, in the depicted deployment scenario, as a backhaul node in the mesh network, such that other nodes utilize the backhaul connection 131 of node 101 to reach the core network. Vehicle 101 has backhaul connection 131, to macro cell 111, which may be an LTE backhaul connection. Police vehicles 102, 103, 104 are each connected wirelessly to fire engine 101 via a wireless mesh backhaul connection, e.g., vehicle 102 has backhaul connection 132, to vehicle 101; vehicle 103 has backhaul connection 133, to vehicle 101; and vehicle 104 has backhaul connection 134, to vehicle 101, each of which may be provided via Wi-Fi between each vehicle and vehicle 101. Backhaul connection 131 may have a given quality and a given throughput.

As shown, no other macro towers have active connections from vehicles 101, 102, 103, 104. As all backhaul traffic for in-vehicle base stations 101, 102, 103, 104 goes over backhaul connection 131, LTE connection 131 may present a backhaul bottleneck for the mesh network, even under ideal conditions for connection 131. If connection 131 is unreliable, or if macro cell 111 is under load or is otherwise congested, or if vehicle 101 is in motion, or located in a valley or other low elevation area that is difficult to reach by macro cell 111, backhaul for the entire mesh network will be negatively affected. At the same time, macro cells 112, 113, 114 are potentially available for backhaul, but are underutilized by vehicles 102, 103, 104.

Figure 2:
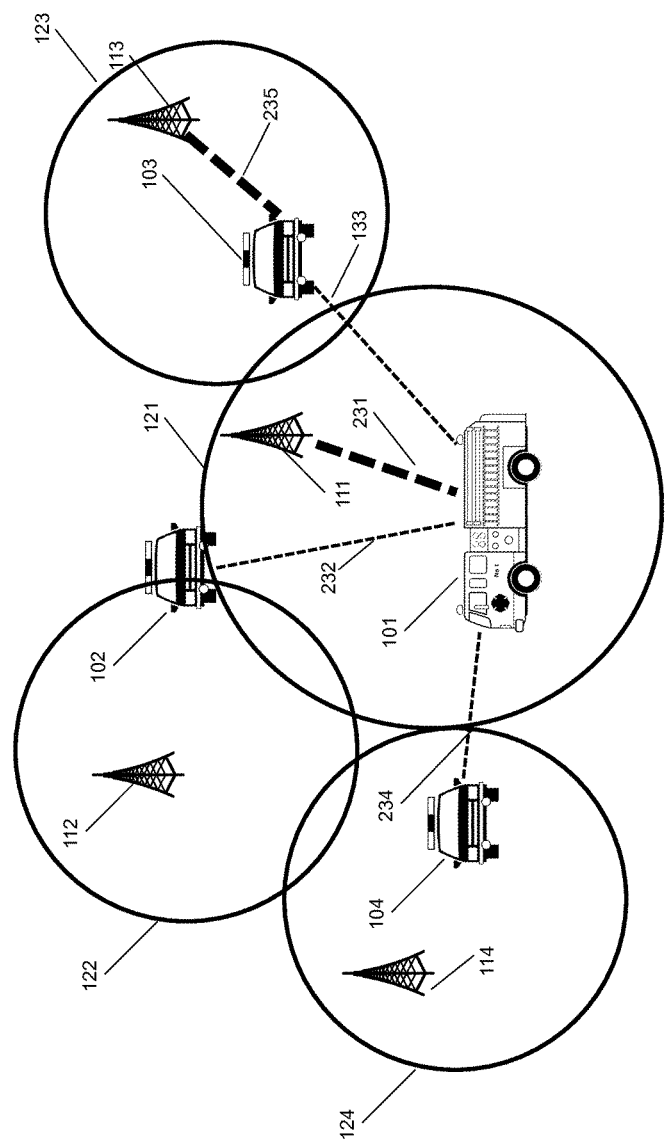
FIG. 2 is a schematic diagram of a second deployment scenario, in accordance with some embodiments.

FIG. 2 is a schematic diagram of a second deployment scenario, in accordance with some embodiments. FIG. 2 is intended to show a subsequent state of the ad-hoc network described above in FIG. 1. Fire engine 101 and police vehicles 102, 103, 104 are co-located and are in a mesh network with each other, as described in relation to FIG. 1. Macro cells 111, 112, 113, 114 have coverage areas 121, 122, 123, 124, respectively. A coordination server (not shown) may be present on a core network.

In some embodiments, vehicle 103 has backhaul link 133 to vehicle 101. However, it has been determined that vehicle 103 has good proximity to macro cell 113. Vehicle 103 has attached to macro cell 113 using a UE modem within the in-vehicle base station located at vehicle 103. As a result, a second backhaul connection 235 has been established. Backhaul link 235 may be shared among the other members of the ad-hoc network, such that nodes 101, 102, and 104 may use the link to send data to and/or receive data from macro cell 113, which may differ in terms of network quality, as well as network topology, from previously-utilized macro cell 111. As well, nodes 101, 102, and 104 also benefit from new backhaul link 235. Users attached to vehicle 103 may use backhaul link 235, while users attached to vehicle 101 may have greater available bandwidth over backhaul link 232. As well, if bandwidth over backhaul link 232 is limited, backhaul link 133 may see higher utilization as a result of node 103 serving as a gateway for backhaul link 235 for vehicles 101, 102, and 104.

In some embodiments the determination of whether to set up a new backhaul connection may be based on one or more parameters, such as: a link quality parameter, such as reference signal received power (RSRP), reference signal received quality (RSRQ), received signal strength indicator (RSSI), a latency measurement, a packet loss measurement, a call drop measurement, a throughput measurement, or another quality parameter; a physical position of one or more of vehicle 103, vehicle 101, macro tower 113, and/or macro tower 111, rendered as global positioning system (GPS) coordinates, lat/long coordinates, or other geographic positioning coordinates; a speed of one or more vehicles 101, 102, 103, 104; and a cell identifier of one or more of macro cell 111 and macro cell 113.

In some embodiments the determination may be performed at vehicle 113, vehicle 101, at another vehicle in the ad-hoc network, or at a coordination server (not shown). In some embodiments the determination may be carried out in a distributed fashion over two or more nodes in the ad-hoc network and/or the coordination server. If performed at the coordination server or at a location other than at vehicle 103, communications may be performed, such as transmitting relevant link measurements and receiving instructions to activate or deactivate links, in connection with performing the determination. If performed at vehicle 103, the determination and link activation/deactivation may be performed without any transmissions or communications.

In some embodiments one or more of nodes 101, 102, 103, 104 may perform routing, filtering, and/or other network management functions for enabling the ad-hoc mesh network to effectively use both backhaul link 131 and 235. The routing, filtering, and/or other network management functions are outside the scope of this disclosure but are known to those having skill in the art.

Figure 3:
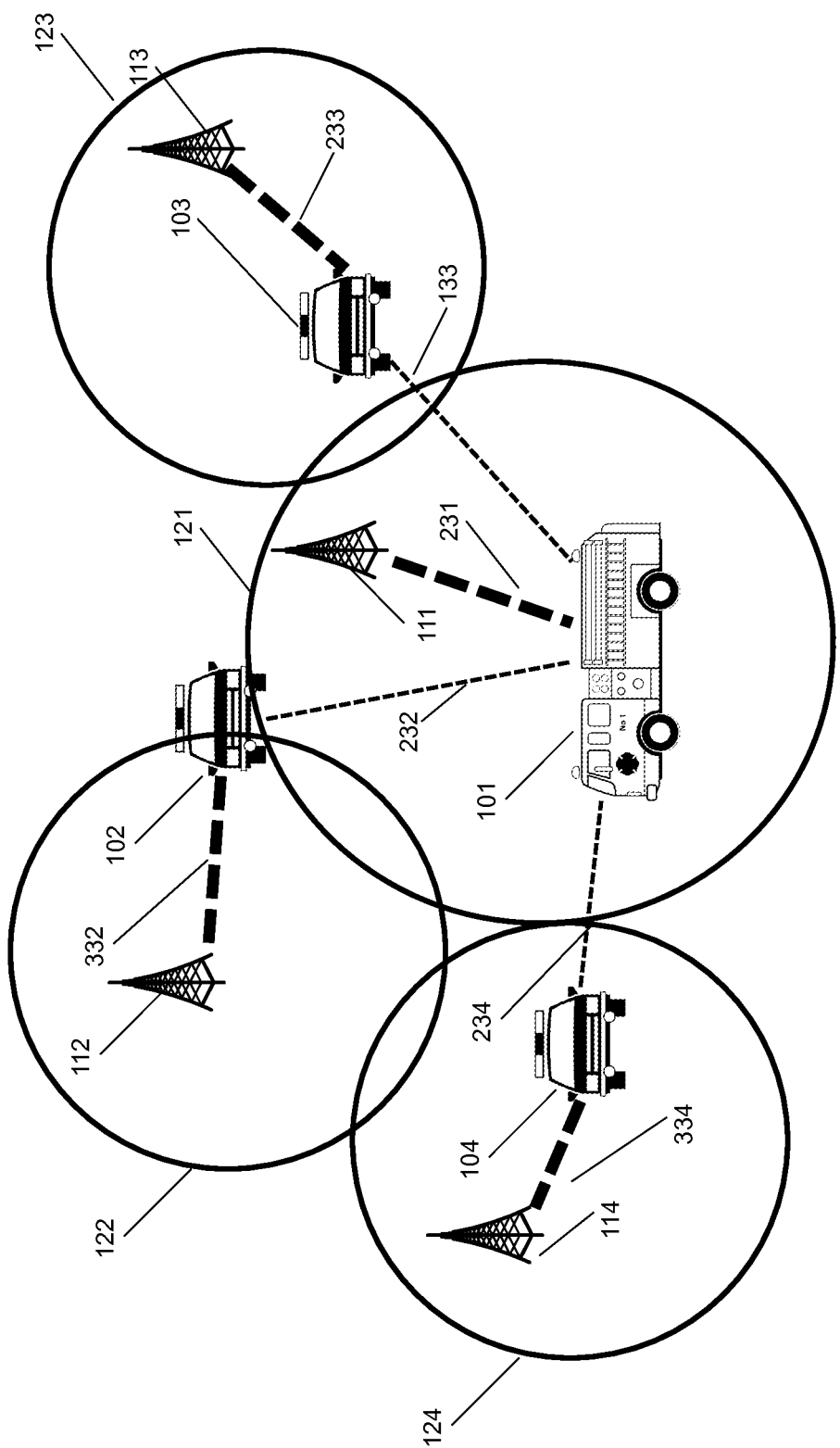
FIG. 3 is a schematic diagram of a third deployment scenario, in accordance with some embodiments.

FIG. 3 is a schematic diagram of a third deployment scenario, in accordance with some embodiments. FIG. 3 is intended to show a subsequent state of the ad-hoc network described above in FIGS. 1 and 2. Fire engine 101 and police vehicles 102, 103, 104 are co-located and are in a mesh network with each other, as described in relation to FIGS. 1 and 2. Macro cells 111, 112, 113, 114 have coverage areas 121, 122, 123, 124, respectively. A coordination server (not shown) may be present on a core network.

In some embodiments, it has been determined that backhaul links are available and desirable between police vehicle 102 and macro cell 112, and police vehicle 104 and macro cell 114, as well as fire engine 101 and macro cell 111 and police vehicle 103 and macro cell 113. This could be the case because of a lack of available bandwidth on backhaul links 231 and 233, or because of good signal quality from macro cells 112 and 114, or both, or another factor. This results in the establishment of backhaul link 332 between police vehicle 102 and macro cell 112, and backhaul link 334 between police vehicle 104 and macro cell 114. At this point all the mesh nodes have a backhaul connection to a different macro cell, which provides a higher aggregate backhaul bandwidth for the mesh network considered as a whole.

In some embodiments, it may be determined, either at one or more vehicles or at a cloud coordination server (not shown), that the location of one or more vehicles is less than optimal for establishing a backhaul link to a particular macro cell. This may be the case, for example, when the cloud coordination server has information about the location or power level of a nearby macro cell. In this case the cloud coordination server may request the vehicle to move to a better location prior to establishing a backhaul connection, or in order to establish a backhaul connection.

The preceding deployment description is exemplary and may be extended to any number of backhaul links beyond two backhaul links. As an example, each mesh node may have its own backhaul link, or more than one backhaul link. Backhaul links may be turned on and turned off arbitrarily based on current conditions and/or the parameters described elsewhere herein.

In some embodiments, a coordination server may record measurements from one or more base stations and remember each backhaul link that is available for use as it is identified based on transmission of the measurements described herein. When greater backhaul capacity is identified to be needed, the coordination server may activate one or more previously-identified links. Backhaul links may also be turned off if it is determined (by a node or by a collection of nodes) that the backhaul needs of the network are adequately met by a currently-available set of backhaul links.

Figure 4:
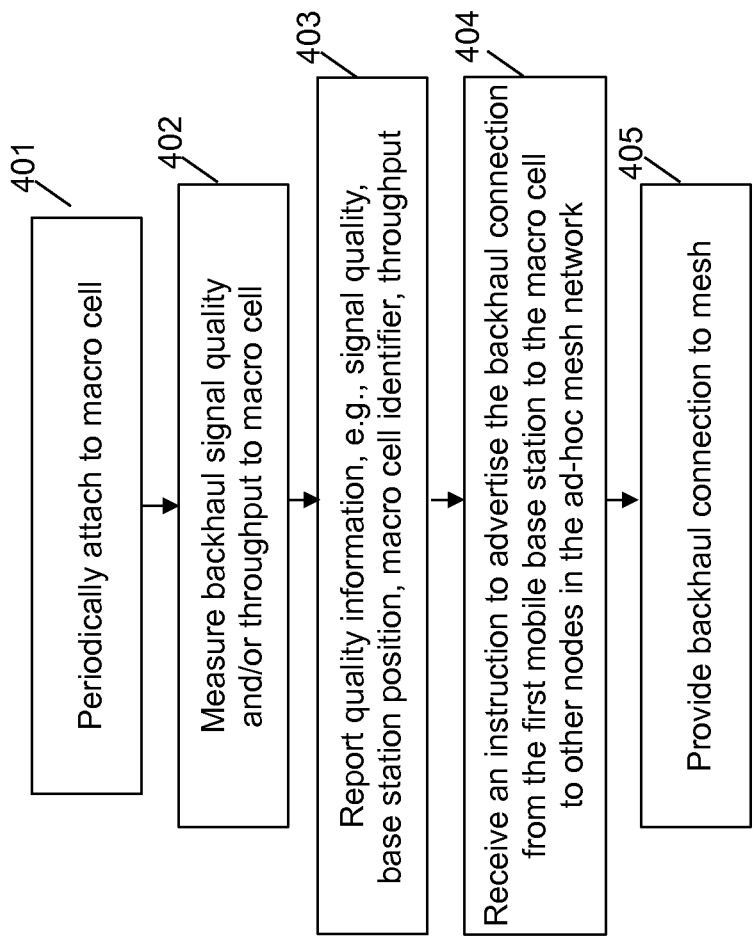
FIG. 4 is a flowchart of a supplemental backhaul identification method performed at a base station, in accordance with some embodiments.

FIG. 4 is a flowchart of a supplemental backhaul identification method performed at a base station, in accordance with some embodiments. At step 401, a base station may periodically attach to a macro cell. The macro cell may be one or more macro cells in the proximity of the base station, determined either by and at the base station or by a coordination server. The periodic attachment may be performed at intervals, may be performed once, or may be performed upon request from one or more nodes in the ad-hoc network or the coordination server. The intervals may be minutes, hours, or days. The intervals may also be based on whether or not the vehicle is in motion, so that when a vehicle is moving at speed the attach may be performed either more or less often, and when the vehicle is stopped and/or reaches its destination the attach may be performed either more or less often, as desired.

At step 402, the base station may measure backhaul signal quality and/or throughput to the macro cell, using any of the parameters described elsewhere herein, e.g., a link quality parameter, such as reference signal received power (RSRP), reference signal received quality (RSRQ), received signal strength indicator (RSSI), a latency measurement, a packet loss measurement, a call drop measurement, a throughput measurement, or another quality parameter; a physical position of one or more vehicles and/or base stations rendered as global positioning system (GPS) coordinates, lat/long coordinates, or other geographic positioning coordinates, or a speed of the vehicles and/or base stations; and a cell identifier of one or more macro cells, such as a physical cell identifier (PCI) or evolved cell global identity (ECGI).

At step 403, quality information obtained at step 402 may be reported to a coordination server. In an alternate embodiment this information may be sent to an internal coordination module, e.g., a self-organizing network (SON) module, in one or more in-vehicle base stations, and/or a SON module spread out over one or more base stations and a coordination server in the core network. At this step, the base station may wait asynchronously to receive an instruction to establish an additional backhaul link. The base station may also reset one or more timers relating to the periodic performance of step 401.

At step 404, the base station may receive an instruction to activate and advertise the backhaul connection from the first mobile base station to the macro cell, e.g., a backhaul link corresponding to link 235 in FIG. 2, to other nodes in the ad-hoc mesh network. In some embodiments the link may be an LTE link, and this may cause the base station to attach, using an LTE UE modem, to the macro cell, wherein the base station appears as a UE to the macro cell. In some embodiments the link may be a Wi-Fi link or other type of link. Advertising the connection may be performed by, without limitation, sending one or more messages to a coordinating server to inform the server that the link is active; sending a multicast message or broadcast message to one or more nodes in the ad-hoc network indicating that the link is active; or establishing new routes at the base station or at a routing node indicating that the link is active.

At step 405, the backhaul connection is ready to be provided to the mesh network, thus providing increased backhaul performance and/or throughput to the network.

Figure 5:
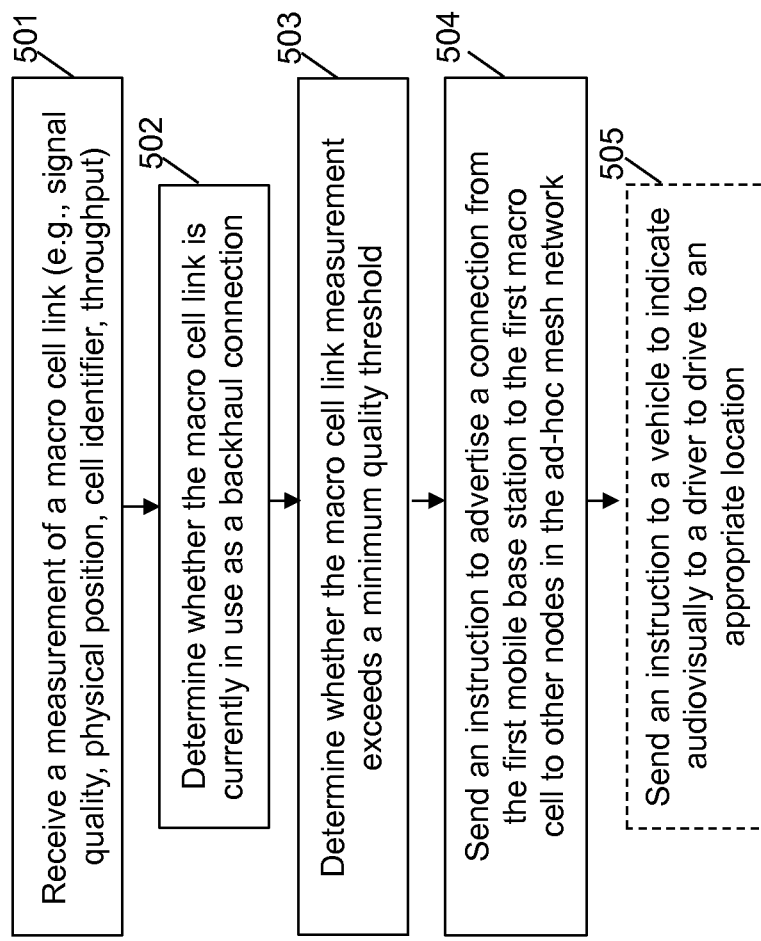
FIG. 5 is a flowchart of a supplemental backhaul identification method performed at a coordinating node, in accordance with some embodiments.

FIG. 5 is a flowchart of a supplemental backhaul identification method performed at a coordinating node, in accordance with some embodiments. At step 501, the coordinating node may receive a measurement of a macro cell link (e.g., one or more messages indicating one or more of signal quality, physical position and/or speed, cell identifier, and throughput) from a base station in an ad-hoc network. If information is insufficient at this stage to determine whether the macro link is a potentially useful link, the coordinating node may request that information from the base station.

At step 502, the coordinating node may determine whether the macro cell link is currently being used as a backhaul connection. At step 503, the coordinating node may determine whether the macro cell link measurement exceeds a minimum quality threshold. If it does exceed the quality threshold, the link may be designated to be activated at step 504.

In some embodiments the determination of whether to establish the new backhaul link may involve requesting additional information from the base station(s) in the ad-hoc mesh network. The determination may be based on one or more of the received factors. If the existing backhaul is sufficient, the coordinating node may decline to activate the new backhaul connection. Other embodiments are also contemplated. For example, an embodiment where most or all backhaul links are created and activated is contemplated, as is an embodiment where predictive analytics of prior in-vehicle base station motion are used to predict which backhaul links will be available at which times, and which links to establish when. As another example, a throughput model for each macro base station may be used at the coordinating node, such that the coordinating node may be able to determine, either from base station measurements or via core network measurements or via other SON measurements, what fraction of available throughput is in use at the macro cell link, consequently considered in determining whether the link should be activated. In some embodiments, a weighted formula may be used to combine multiple factors. In some embodiments, a UE modem located inside the in-vehicle base station may be able to report information relating to the existing macro coverage environment to the coordinating node, and the coordinating node may use this information for providing self-organizing network (SON) capability.

At step 505, the coordinating node may optionally provide information to the driver of an in-vehicle base station to indicate audiovisually to a driver where to drive to obtain a higher-quality backhaul link. For example, a police car may be instructed to drive to the top of a hill or may be instructed to drive to a particular location. This may be performed with autonomous or semi-autonomous vehicles, such as self-driving cars and aerial drones, in some embodiments. In some embodiments the vehicle's driver may be able to refuse a request to move to another location, and/or may be able to refuse the request to turn on an additional backhaul link.

Figure 6:
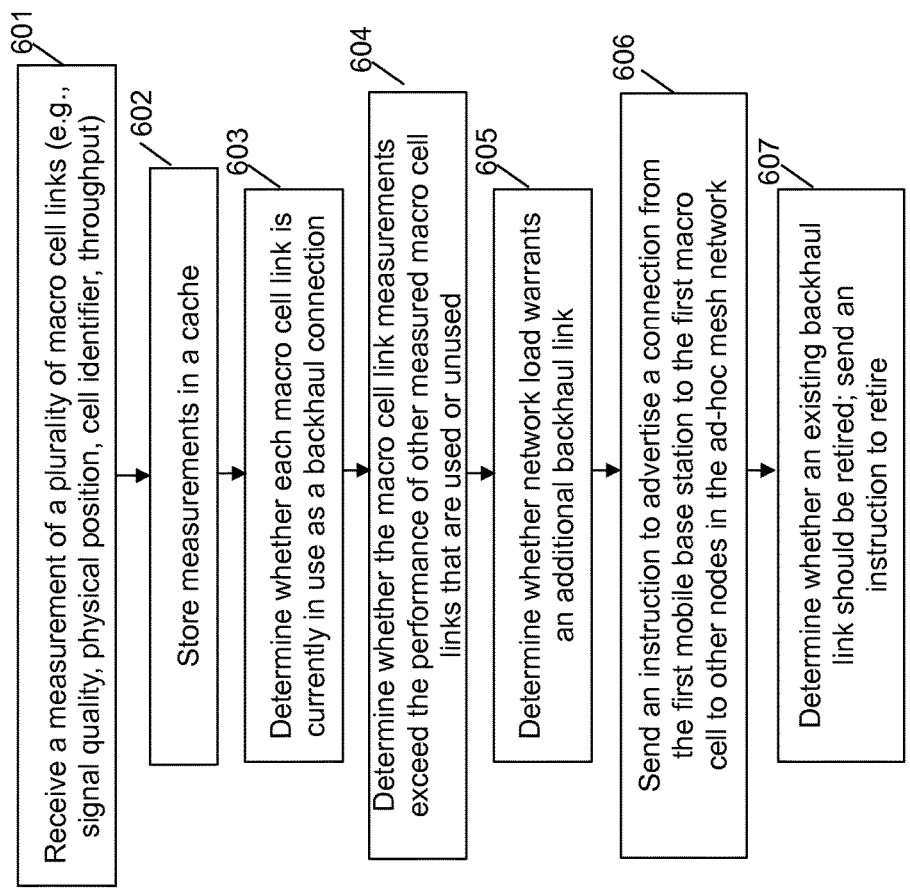
FIG. 6 is a flowchart of a supplemental backhaul identification method performed at a coordinating node, in accordance with some embodiments.

FIG. 6 is a flowchart of a supplemental backhaul identification method performed at a coordinating node, in accordance with some embodiments. At step 601, the coordinating node may receive a measurement from one or more base stations for a plurality of macro cell links, wherein the measurements include signal quality, physical position, cell identifiers, and throughput as described elsewhere herein. At step 602, these measurements may be stored in a cache, a table, or another data storage mechanism. At step 603, each identified macro cell link may be evaluated to determine whether the link is in use for backhaul. At step 604, each identified macro cell link may be evaluated to determine whether the link measurements equal or exceed the performance of other measured macro cell links that are used or unused. At step 605, network load may be evaluated to determine whether additional backhaul links are warranted.

At this point, all macro cell links that are desired to be set up have been identified. At step 606, an instruction may be sent based on the results of the prior step to indicate to the one or more base stations which links should be enabled, and additionally, the links are designated as requested to be advertised to other nodes in the ad-hoc mesh network. At step 607, after the links are enabled, one or more base stations may be requested to deactivate existing backhaul links based on information known about the backhaul links and based on a determination performed at the coordination server.

Figure 7:
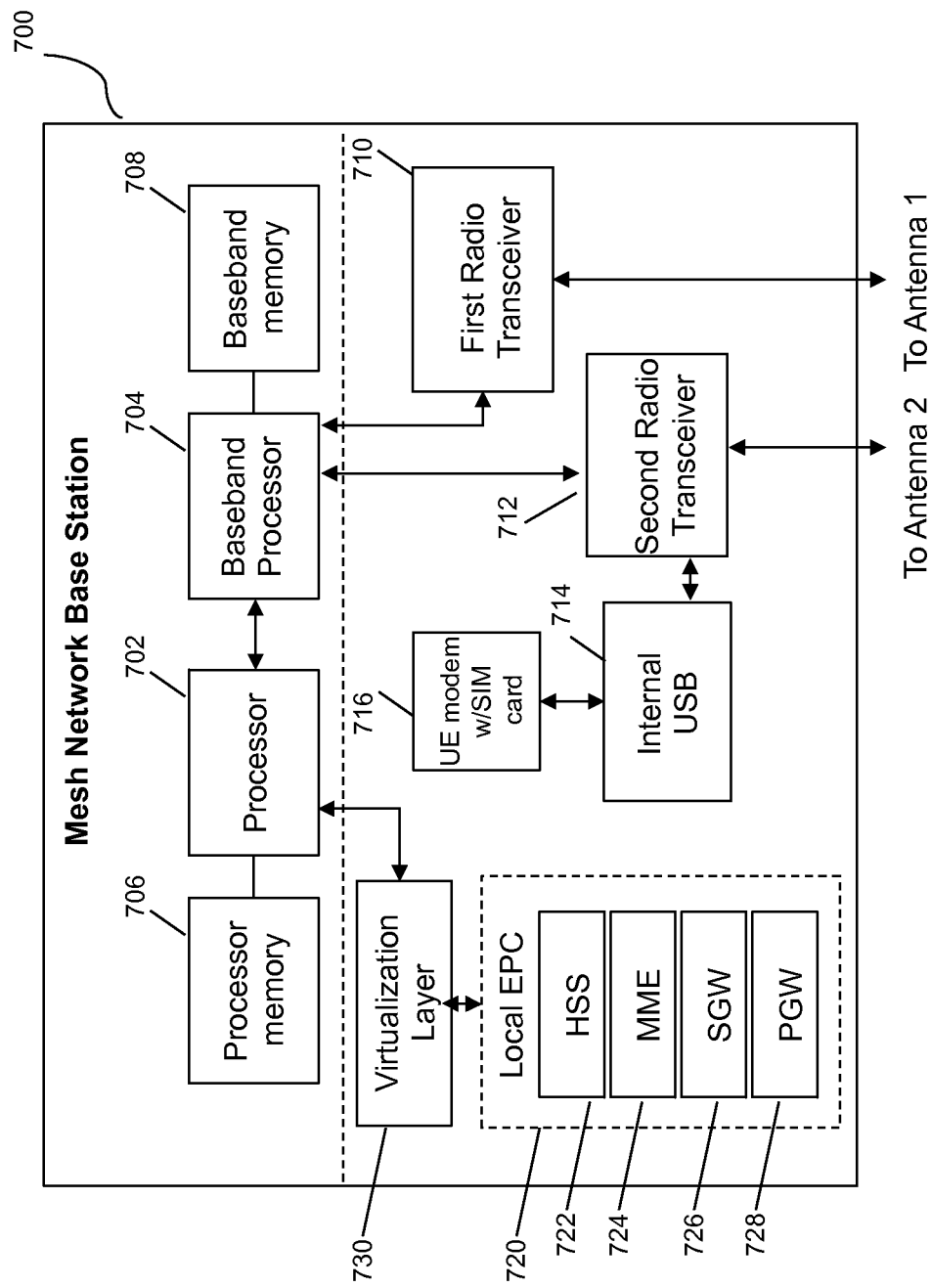
FIG. 7 is a schematic diagram of an in-vehicle base station, in accordance with some embodiments.

FIG. 7 is a schematic diagram of an in-vehicle base station, in accordance with some embodiments. Mesh network base station 700 may include processor 702, processor memory 704 in communication with the processor, baseband processor 706, and baseband processor memory 708 in communication with the baseband processor. Base station 700 may also include first radio transceiver 710 and second radio transceiver 712, internal universal serial bus (USB) port 714, and UE modem with subscriber information module card (SIM card) 716 coupled to USB port 714. In some embodiments, the second radio transceiver 712 itself may be coupled to USB port 714, and communications from the baseband processor may be passed through USB port 714.

A virtualization layer 730 may also be included for mediating communications with an evolved packet core EPC, specifically including the core network EPC (not shown) and local evolved packet core (EPC) module 720. Local EPC 720 may be used for authenticating users and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Virtualization layer 730 and local EPC 720 may each run on processor 702 or on another processor, or may be located within another device.

Processor 702 and baseband processor 706 are in communication with one another. Processor 702 may perform routing functions, and may determine if/when a switch in network configuration is needed. Baseband processor 706 may generate and receive radio signals for both radio transceivers 710 and 712, based on instructions from processor 702. In some embodiments, processors 702 and 706 may be on the same physical logic board. In other embodiments, they may be on separate logic boards.

The first radio transceiver 710 may be a radio transceiver capable of providing LTE eNodeB functionality, and may be capable of higher power and multi-channel OFDMA. The second radio transceiver 712 may be a radio transceiver capable of providing LTE UE functionality. Both transceivers 710 and 712 are capable of receiving and transmitting on one or more LTE bands. In some embodiments, either or both of transceivers 710 and 712 may be capable of providing both LTE eNodeB and LTE UE functionality. Transceiver 710 may be coupled to processor 702 via a Peripheral Component Interconnect-Express (PCI-E) bus, and/or via a daughtercard. As transceiver 712 is for providing LTE UE functionality, in effect emulating a user equipment, it may be connected via the same or different PCI-E bus, or by a USB bus, and may also be coupled to SIM card 718.

SIM card 718 may provide information required for authenticating the simulated UE to the evolved packet core (EPC). When no access to an operator EPC is available, local EPC 720 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 710 and 712, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 702 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 710 and 712. Baseband processor 706 may use memory 708 to perform these tasks.

Figure 8:
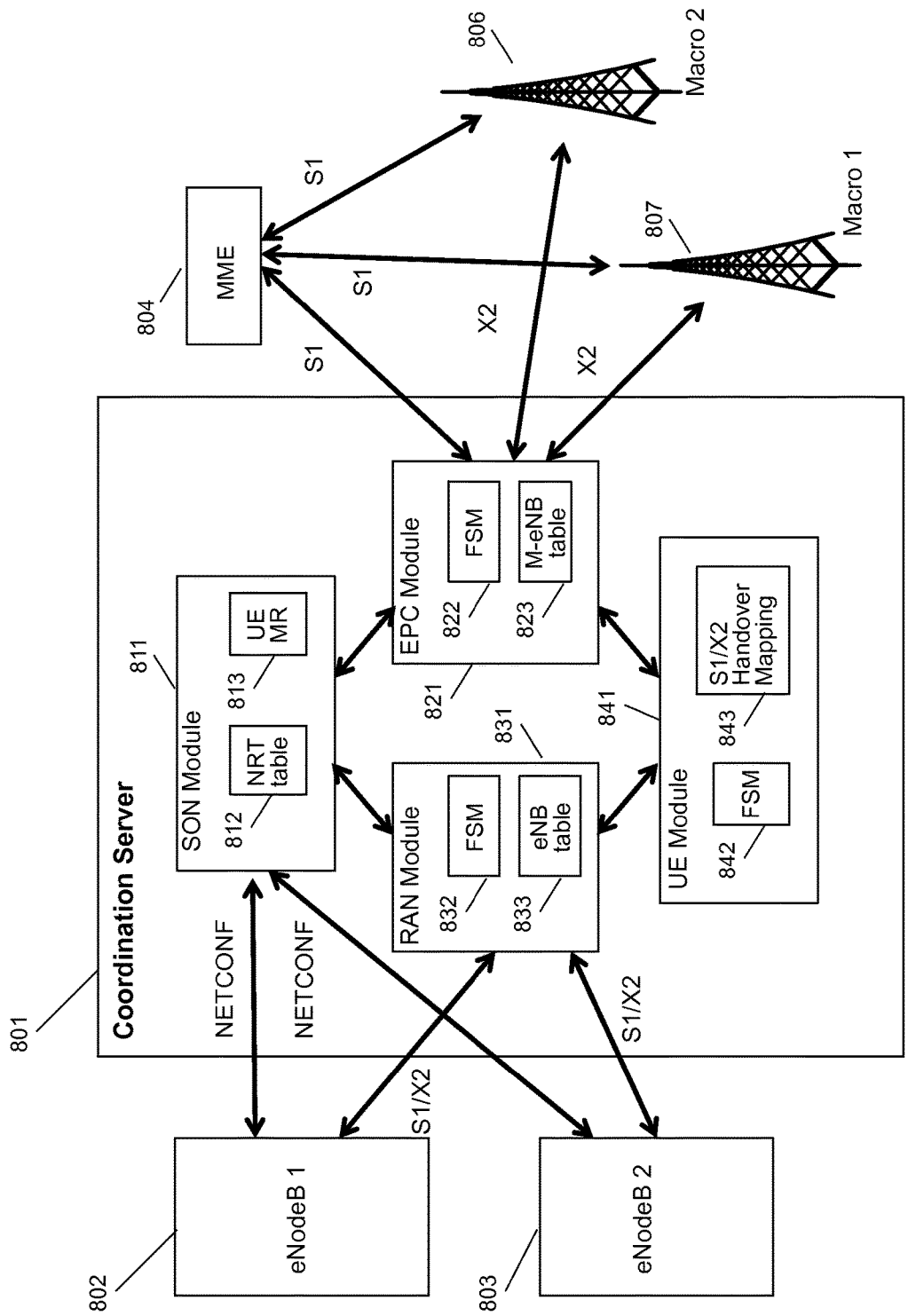
FIG. 8 is a schematic diagram of a coordinating node, in accordance with some embodiments.

FIG. 8 is a schematic diagram of a coordinating node, in accordance with some embodiments. Coordination server 801 provides services to, and is coupled to, eNodeB 1 802 and eNodeB 2 803, on a RAN side of a network (i.e., inside of the gateway). Coordination server 801 provides services to, and is coupled to, MME 804, macro eNodeB 805, and macro eNodeB 806, on a core network side of the network (outside of the gateway). The coordination server is not shown in FIGS. 1 and 2.

Within coordination server 801 are self-organizing network (SON) module 811, containing neighbor relation table (NRT) 812 and UE measurement report processing module 813; evolved packet core (EPC) module 821, containing EPC finite state machine module 822 and macro eNodeB table 823; radio access network (RAN) module 831, containing eNodeB finite state machine module 832 and eNodeB table 834; and user equipment (UE) module 841, containing UE finite state machine module 842 and S1/X2 handover mapping table 843. Each of modules 811, 821, 831, and 841 are coupled to each other within coordination server 801, and may execute on one or more shared processors (not shown) coupled with memory (not shown).

In some embodiments, SON module 811 may perform NRT maintenance, load information processing and fractional frequency reuse (FFR) processing; RAN module 831 may perform X2 association management with eNodeBs 802, 803; EPC module 821 may perform X2 association management with macro eNodeBs 805, 806; and UE module may perform X2 handover and S1/X2 translation between eNodeBs 802, 803 and macro eNodeBs 805, 806. All the above managers/modules interact with each other to accomplish the assigned functionality.

In the present disclosure, the words "eNodeB" or "eNodeB" are used to refer to a cellular base station. However, one of skill in the art would appreciate that it would be possible to provide the same functionality and services to other types of base stations, specifically to home eNodeBs (HeNodeBs), as well as any equivalents.

In the present disclosure, the words "federated," "virtualized," "proxy" or "proxied" may be viewed as aspects of the same concept. For example, it should be understood that the federated X2 gateway provides X2 virtualization, in that it federates X2 messages from a plurality of eNodeBs and virtualizes the plurality of eNodeBs to provide a single virtualized eNodeB. The X2 gateway provides this federation or virtualization at least in part by providing proxy functionality, such that X2 messages from each of the plurality of eNodeBs may be proxied by the X2 gateway to and from an EPC or core network node. Other meanings would be apparent to one having ordinary skill in the relevant technology area. The X2 gateway could be part of an LTE access controller or core network node, part of an eNodeB, co-located with another device, or on its own independent device.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Various alternative embodiments are also contemplated by the inventors. For example, certain functions may be performed at an eNodeB, or at a multi-radio access technology node (multi-RAT) node, instead of at a virtualization server. The virtualization server may be known as an LTE access controller. The functions of the virtualization server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

Any of the features described herein may be provided at a base station, at a core network node, or distributed across some combination thereof. Any of the features described herein is contemplated to be able to be combined in any combination, even if not explicitly described herein.

The invention claimed is:

1. A method for providing backhaul capacity in an ad-hoc mesh network, comprising:
   attaching, at a first mobile base station that is a node of an ad-hoc mesh network, to a macro cell;
   measuring, at the first mobile base station, at least one of a backhaul signal quality with the macro cell and a throughput to the macro cell;
   reporting, from the first mobile base station to a coordinating node, information comprising at least two of: a signal quality parameter, a physical position of the first mobile base station, a cell identifier of the macro cell, and the measured throughput;
   receiving, at the first mobile base station, an instruction to advertise a backhaul connection from the first mobile base station to the macro cell to other nodes in the ad-hoc mesh network, thereby providing an increase in overall backhaul capacity of the ad-hoc mesh network;
   determining whether the macro cell is currently in use as a backhaul connection for the ad-hoc mesh network, and whether the macro cell information exceeds a minimum quality threshold; and
   sending, to the first mobile base station, an instruction to advertise the backhaul connection from the first mobile base station to the macro cell to other nodes in the ad-hoc mesh network.

2. The method of claim 1, wherein the signal quality parameter is one of a Reference Signal Received Power (RSRP) and a Reference Signal Received Quality (RSRQ), and wherein the cell identifier is a Long Term Evolution (LTE) Enhanced Cell Global Identifier (eCGI) or physical cell identifier (PCI).

3. The method of claim 1, wherein the physical position is a set of coordinates derived using a Global Positioning System (GPS).

4. The method of claim 1, wherein the ad-hoc mesh network is a Wi-Fi mesh network.

5. The method of claim 1, wherein the first mobile base station is a vehicle-mounted base station with Wi-Fi and cellular radio access connectivity.

6. The method of claim 1, further comprising attaching periodically to the macro cell, and reporting the information periodically, wherein the macro cell is a particular macro cell that is available at the time that attaching is performed.

7. The method of claim 1, wherein determining is performed at the first mobile base station.

8. The method of claim 1, wherein determining is performed at the coordinating node.

9. The method of claim 1, wherein the first mobile base station further comprises a cellular modem coupled to the base station via serial interface.

10. The method of claim 1, wherein the first mobile base station is a multi-radio access technology node having at least a Long Term Evolution (LTE) modem.

11. The method of claim 9, wherein the cellular modem is a Long Term Evolution (LTE modem).

12. The method of claim 1, wherein the macro cell is not being used as backhaul by the ad-hoc mesh network.

13. A method for providing backhaul capacity in an ad-hoc mesh network, comprising:
attaching, at a first mobile base station that is a node of an ad-hoc mesh network, to a macro cell;
measuring, at the first mobile base station, at least one of a backhaul signal quality with the macro cell and a throughput to the macro cell;
reporting, from the first mobile base station to a coordinating node, information comprising at least two of: a signal quality parameter, a physical position of the first mobile base station, a cell identifier of the macro cell, and the measured throughput;
receiving, at the first mobile base station, an instruction to advertise a backhaul connection from the first mobile base station to the macro cell to other nodes in the ad-hoc mesh network, thereby providing an increase in overall backhaul capacity of the ad-hoc mesh network; and
subsequently adjusting backhaul capacity by adding or removing additional backhaul connections to or from the ad-hoc mesh network.

14. A base station in an ad-hoc wireless network, comprising:
a processor; and
a memory coupled to the processor and containing instructions which, when executed, are configured to cause the processor to perform steps comprising:
attaching, at a first mobile base station that is a node of an ad-hoc mesh network, to a macro cell;
measuring, at the first mobile base station, at least one of a backhaul signal quality with the macro cell and a throughput to the macro cell;
reporting, from the first mobile base station to a coordinating node, information comprising at least two of: a signal quality parameter, a physical position of the first mobile base station, a cell identifier of the macro cell, and the measured throughput;
receiving, at the first mobile base station, an instruction to advertise a backhaul connection from the first mobile base station to the macro cell to other nodes in the ad-hoc mesh network;
determining whether the macro cell is currently in use as a backhaul connection for the ad-hoc mesh network, and whether the macro cell information exceeds a minimum quality threshold; and
sending, to the first mobile base station, an instruction to advertise the backhaul connection from the first mobile base station to the macro cell to other nodes in the ad-hoc mesh network.

15. A base station in an ad-hoc wireless network, comprising:
a processor; and
a memory coupled to the processor and containing instructions which, when executed, are configured to cause the processor to perform steps comprising:
attaching, at a first mobile base station that is a node of an ad-hoc mesh network, to a macro cell;
measuring, at the first mobile base station, at least one of a backhaul signal quality with the macro cell and a throughput to the macro cell;
reporting, from the first mobile base station to a coordinating node, information comprising at least two of: a signal quality parameter, a physical position of the first mobile base station, a cell identifier of the macro cell, and the measured throughput;
receiving, at the first mobile base station, an instruction to advertise a backhaul connection from the first mobile base station to the macro cell to other nodes in the ad-hoc mesh network; and
subsequently adjusting backhaul capacity by adding or removing additional backhaul connections to or from the ad-hoc mesh network.

* * * * *